(12) United States Patent
Van Riel et al.

(10) Patent No.: US 6,401,042 B1
(45) Date of Patent: Jun. 4, 2002

(54) METHOD OF DETERMINING SPATIAL CHANGES IN SUBSURFACE STRUCTURE, STRATIGRAPHY, LITHOLOGY AND FLUID CONTENT AND OF REDUCING SEISMIC NOISE

(75) Inventors: Paul Van Riel, Rotterdam; Paul Johannes Albertus Tijink, Amersfoort, both of (NL)

(73) Assignee: Jason Geosystems B.V. (NL)

( * ) Notice: Subject to any disclaimer, the term of this patent is extended or adjusted under 35 U.S.C. 154(b) by 0 days.

(21) Appl. No.: 09/586,047

(22) Filed: Jun. 2, 2000

(30) Foreign Application Priority Data

Jun. 3, 1999 (EP) .............................................. 99201782

(51) Int. Cl.$^7$ ................................................. G01V 1/28
(52) U.S. Cl. ........................................................ 702/17
(58) Field of Search ............................. 702/17, 18, 14; 367/73; 706/929

(56) References Cited

U.S. PATENT DOCUMENTS 4,849,887 A    7/1989   Skylas ........................ 364/421
5,056,066 A   10/1991   Howard ....................... 367/72
5,677,893 A * 10/1997   de Hoop et al. .............. 702/14
5,737,220 A *  4/1998   Miller ........................ 702/14
5,892,732 A    4/1999   Gersztenkorn ............... 367/72

FOREIGN PATENT DOCUMENTS

EP    0889331     1/1999
WO    9713166     4/1997

* cited by examiner

*Primary Examiner*—Donald E. McElheny, Jr.
(74) *Attorney, Agent, or Firm*—Webb Ziesenheim Logsdon Orkin & Hanson, P.C.

(57) ABSTRACT

A method for reducing noise and for deriving new data from seismic and seismic derived rock property data includes determining a rate of change and direction of rate of change of amplitudes of seismic and seismic derived rock property cubes along microlayer horizons and filtering this data long the microlayer horizons. To facilitate this determination, microlayer horizons can be locally rotated around each microlayer horizon definition point. The data determined for the microlayer horizons are sequentially organized in time whereupon a display of the microlayer horizons can be sequentially stepped through to view the output data of each microlayer horizon.

24 Claims, 11 Drawing Sheets

METHOD OF DETERMINING SPATIAL CHANGES IN SUBSURFACE STRUCTURE, STRATIGRAPHY, LITHOLOGY AND FLUID CONTENT AND OF REDUCING SEISMIC NOISE

BACKGROUND OF THE INVENTION

1. Field of the Invention

This invention relates to the general subject of reducing noise in seismic and seismic derived rock property data; deriving various new data from input seismic and seismic derived rock property data which highlight spatial changes in subsurface structure, stratigraphy, lithology and rock fluids; and to the analysis and interpretation of such data.

2. Description of the Prior Art

Seismic data is acquired to provide information about the subsurface structure, stratigraphy, lithography and fluids contained in the rocks. Acquired seismic data records are the response of a seismic energy source after passing through and being reflected by rocks in the subsurface. Seismic data can be acquired at or close to the earth's surface or can be acquired along boreholes. After acquisition, seismic data is typically processed to a set of seismic traces, where each trace represents the seismic response at a certain surface x,y location. The trace itself consists of a series of samples of the seismic response, usually ordered to correspond to increasing seismic travel time or, after depth conversion, increasing depth. Dependent on the acquisition geometry, the seismic traces are usually processed and organized to form lines with regularly spaced traces along the surface. The seismic data along such lines can be viewed as sections through the earth. Seismic data is referred to as 2D seismic data when the lines are in different directions or are far apart relative to the spacing of the traces. Seismic data is referred to as 3D seismic data when the acquisition is such that the processing results in a set of seismic lines that are organized sequentially and where the x,y trace locations form a regular grid and such that the spacing of the seismic lines generally is within the same order of magnitude as the spacing of the traces within the lines. In practice, the lines along which the data is acquired are called inlines and lines orthogonal to the inlines are referred to as crosslines. FIG. 1 shows a seismic section with a number of seismic data traces taken from the 3D seismic data cube of which the x,y grid is shown in FIG. 2. 2D and 3D seismic data sets are subsequently analyzed and interpreted, generally on computer workstations with specialized software, to reveal the subsurface structure, stratigraphy, lithography and fluids, and to so predict the location, structure, stratigraphy, lithology and fluid distribution of hydrocarbon reservoirs, associated aquifers and other subsurface features of interest. FIG. 3 shows a structural interpretation of the seismic data of FIG. 1. This interpretation delineates the overall reservoir zone, within which high seismic amplitudes correlate to oil sands. The interpretation also shows structural and stratigraphic relationships. Structural relationships typically relate to faulting, for example in FIG. 3 the interpretation shows how the layers defined by the horizons are broken up by the faults. Stratigraphic relationships typically relate to deposition and erosion. For example an interpretation may show how an erosional surface truncates lower lying layers.

The amplitudes of the seismic data are primarily determined by the strength of the reflection of seismic waves at layer boundaries. The reflection strength in turn is determined by changes in certain physical parameters of the rocks when going from one layer to the next. These physical parameters are determined by the physical properties of the rock matrix, i.e. the rock with empty rock pores, and fluids contained in the pores, jointly referred to as 'rock property data'. Changes in the rock matrix can be caused by changes in the lithology (rock mineral composition and build-up). Changes in fluids arise from changes in fluid type: water, oil and gas; or changes in properties of the fluid types. Using modern computer algorithms, rock property data can be estimated from the amplitudes of the seismic data. Rock property data which may be directly estimated from seismic data includes acoustic impedance, elastic impedance, pressure wave velocity, shear wave velocity and density. Further rock property data can also be drived directly or indirectly using functional, statistical or other relationships between the different rock properties. Seismic derived rock property data can be directly used to analyze changes in lithology and fluids in layers. Also, information about structure and stratigraphy is maintained and often even enhanced relative to seismic data. Use of seismic derived rock property data in subsurface analysis and interpretation is therefore often preferred over the use of seismic reflection data, or is done in conjunction with seismic data subsurface analysis and interpretation. For the same reason the subject method is preferably applied to seismic derived rock property data. FIG. 4 shows the same section as FIG. 1, but now shows a section through an acoustic impedance rock property cube derived from the seismic reflection data. Changes in acoustic impedance result in changes of seismic reflection coefficients. In other words, acoustic impedance is a layer property whereas the seismic reflection coefficients relate to the layer interface. Analysis of the difference between the seismic data and the acoustic impedance data reveals that oil bearing sands and their boundaries can be more accurately interpreted from the acoustic impedance data than from the seismic data itself.

To characterize an interpreted horizon or fault plane the dip and azimuth may be calculated at each horizon point. As illustrated in FIG. 5, the dip at an horizon point is the angle from the vertical to the gradient vector of a plane tangent to the horizon surface at the horizon point. The azimuth is the angle of the projection of the gradient vector on a horizontal plane calculated clockwise generally relative to North.

One key aspect of seismic and seismic derived rock property data is that generally this data does not contain sufficient information to at each sample determine all the required data about the structure, stratigraphy, lithology and fluid at that sample. Additional information is provided by analyzing and interpreting spatial variations in the seismic and seismic derived rock property data. For example, from the character of a spatial change it can be determined if the change is due to a change in structure, e.g. a fault, or due to a change in lithology or in fluids. The problem is that the information about the spatial variations is often not easily discerned or readily quantified from the seismic or seismic derived rock property data. This motivates the need for methods which generate data which highlight spatial changes in subsurface structure, stratigraphy, lithology and fluids, and for methods to analyze and interpret such data.

Methods have been described which focus on calculating certain measures of spatial discontinuity using only seismic data. These methods do not utilize the information captured in an interpretation of the seismic data. The proposed method departs from existing methods by employing a subsurface model, based on an available interpretation, to drive the calculation of new types of measures of spatial changes in subsurface structure, stratigraphy, lithology and fluids. These measures are derived from changes in the amplitudes of seismic data or seismic derived rock property data along horizons. One such measure is the gradient of the amplitudes, for distinction with the gradient of a geometric surface, referred to as the property gradient. This property gradient is determined at each horizon point by fitting a surface through amplitudes at the horizon point and surrounding horizon points, and calculating the gradient of this surface. Large gradients correspond to rapid lateral changes. An alternative method to characterize the amplitude changes is by smoothing the amplitude data along the horizon by filtering, and then taking the difference of the filtered and input data as measure of the rate of change of the amplitudes. Such filtering operations also reduce noise, and as such provide a new way to reduce noise in the input seismic and seismic derived rock property data.

SUMMARY OF THE INVENTION

The present invention provides a new and improved process to reduce noise in seismic and seismic derived rock property data; to generate data revealing information about the spatial variation of subsurface structure, stratigraphy, lithology and fluid content from seismic and seismic derived frock property data; and to analyze and interpret that data. The method uses as input seismic or seismic derived rock property data and an interpretation of this data. From the interpretation a subsurface model, in the following referred to as an earthmodel is built. The process calculations are driven by this earthmodel. In brief, the main steps for the 3D version of the process are:

Obtain seismic or seismic derived rock property data; interpret this data to define the horizons and faults which determine boundaries of layers of interest; from the horizons and faults and stratigraphic and structural relationships between the horizons and faults build an earthmodel where the input horizons and faults form the boundaries of the earthmodel main layers; guided by the stratigraphic and structural relationships, subdivide each earthmodel main layer into microlayers bounded by microlayer horizons defined at seismic or seismic derived rock property x,y grid points such that the microlayer horizons define the internal structure of each of the earthmodel main layers; for each grid point of each microlayer horizon find the spatial coordinates of a set of surrounding grid points on the microlayer horizon, which together define a microlayer horizon surface segment; rotate the microlayer horizon surface segment in the inline and crossline direction over a user defined angle range with a user defined step size around the current definition point to define the spatial coordinates of the rotated microlayer horizon surface segment; for this rotated microlayer horizon surface segment extract the corresponding seismic or seismic derived rock property data amplitudes; from these extracted amplitudes calculate one or multiple measures for the rate of change of these amplitudes along the current rotated microlayer horizon segment by calculating the size of the gradient or using various filters, the direction of the gradient, and the filter outputs; repeat for all angles in both the inline and crossline direction; for each rate of change measure determine the angles where the rate of change measure is minimum and for those angles store as output data the rotation angle dip and azimuth, the rate of change measure, the gradient direction and filter outputs; repeat this process for all grid points on each microlayer horizon and for all microlayer horizons; output the results in the form of a set of microlayer horizons where each microlayer horizon point contains the corresponding process output data; generate further output by interpolating the microlayer horizons to the seismic and seismic derived rock property grids; analyze and interpret the output data containing the information on spatial changes to predict lateral variations in substrate structure, stratigraphy, lithology and fluid distribution. Analysis and interpretation of the interpolated output data can be done on standard seismic workstations using section, map and 3D viewing and interpretation tools. The microlayer horizons themselves can be analyzed and interpreted in a new way, whereby the microlayer horizons are viewed in map view (see FIG. 8,9 and 10) or in 3D, and where the user can cycle through the stack of microlayer horizons to review changes along the microlayer horizons.

The generated output data highlights information about lateral variations in subsurface structure, stratigraphy, lithology and fluid distribution not directly apparent in the input seismic or seismic derived rock property data. Additionally, the generated output data contains filtered versions of the input seismic or seismic derived rock property data in which noise is reduced and therefore can be used to advantage in standard seismic or seismic derived rock property data analysis and interpretation.

The process is driven by a geologic model, which generally will not tend to capture detailed changes in subsurface structure, stratigraphy, lithology and fluid distribution. The process compensates for geometric inaccuracies in the geologic model by the specified angle perturbation procedure. In fact, useful data with the subject process may be generated based on a very simple model. In its most simple form such a model will consist of a layer bounded by two parallel horizons. The process can also be run without angle perturbation (angle range=0). In such a case the output can be used to assess the spatial changes in structure, stratigraphy, lithology and fluid distribution relative to the geometric model itself. In practical application the process may be applied consecutive times where the output is used to improve the geometric model, which in turn is used to generate improved data about spatial changes in subsurface structure, stratigraphy, lithology and fluid distribution.

The invention is particularly applicable to hydrocarbon exploration, development and production to determine the structure, stratigraphy, lithology and fluid distribution in hydrocarbon reservoirs and associated aquifers, and to determine fluid movement from seismic surveys repeated in time over a reservoir as it is depicted. The data generated by the process reveals how structure, stratigraphy, lithology and fluid distribution changes spatially, and how rapid such changes are. Rapid changes can point out overall reservoir boundaries or boundaries between different reservoir units and fluid contacts. More subtle changes can point to for example increasing or decreasing porosity and the % of hydrocarbon bearing rock relative to non-hydrocarbon bearing rock. Data generated by the process can reveal details about spatial changes in structure, stratigraphy, lithology and fluid distribution which are not easily detected when working with the seismic and seismic derived rock property data. Similarly, when the process is applied to repeated seismic surveys, enhanced detection of the movement in time of the fluid boundaries may be achieved.

The process is not limited to application in hydrocarbon exploration, production and development. Any analysis and interpretation of seismic or seismic derived rock property data with the purpose of determining subsurface structure, stratigraphy, lithology and fluid distribution may benefit from the process.

DETAILED DESCRIPTION OF THE PREFERRED EMBODIMENTS

Figure 1:
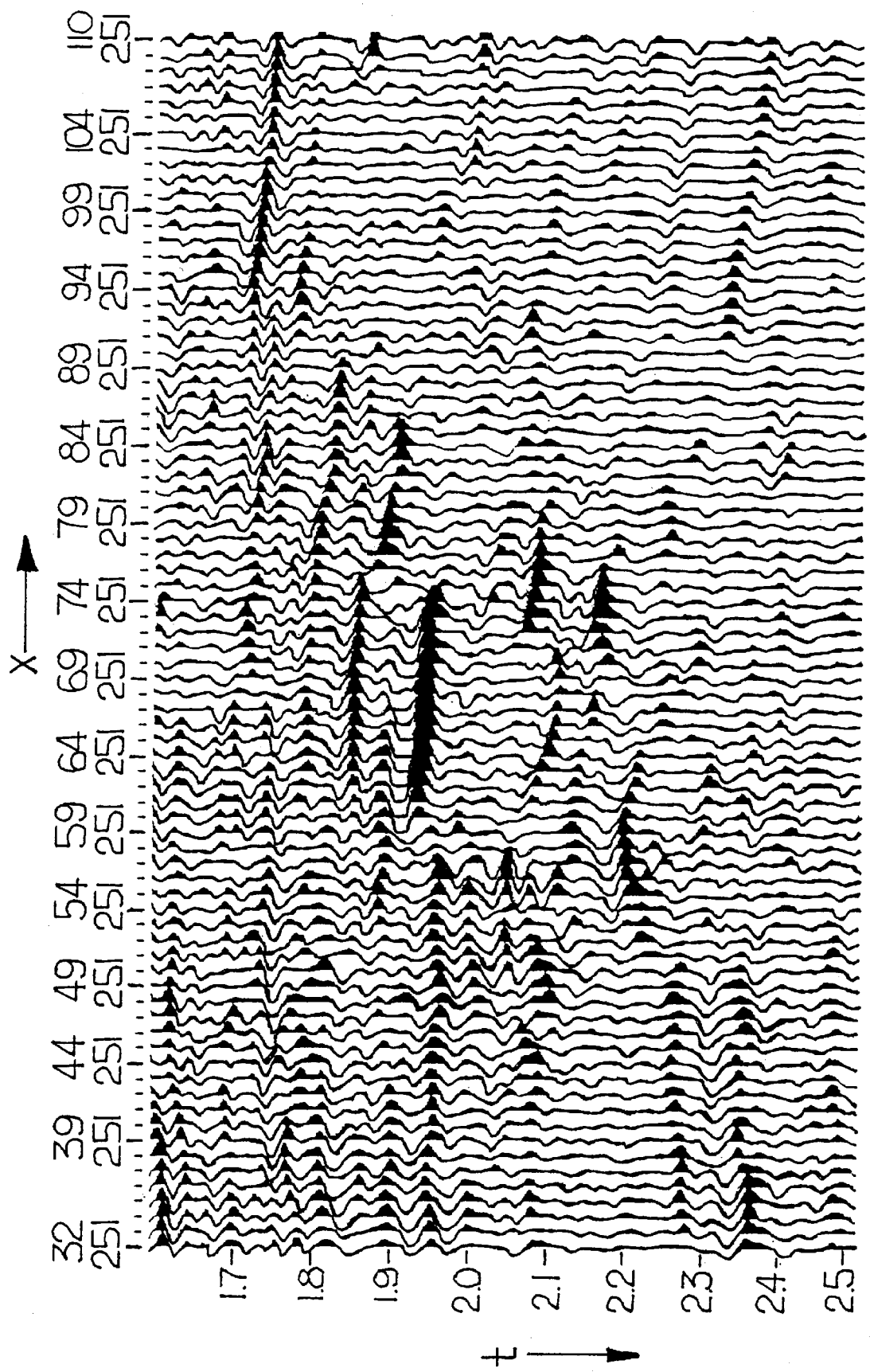
FIG. 1 is an example of a seismic section from a 3D seismic cube. Shown are traces with x-positions ranging from 32 to 110 and a y-position 251. The seismic response at each trace is shown as function of the traveltime t. The seismic amplitudes are filled with black for a positive deflection, and unfilled for a negative deflection. The size of the deflections indicates the strength of the underlying reflections from the earth.
Figure 2:
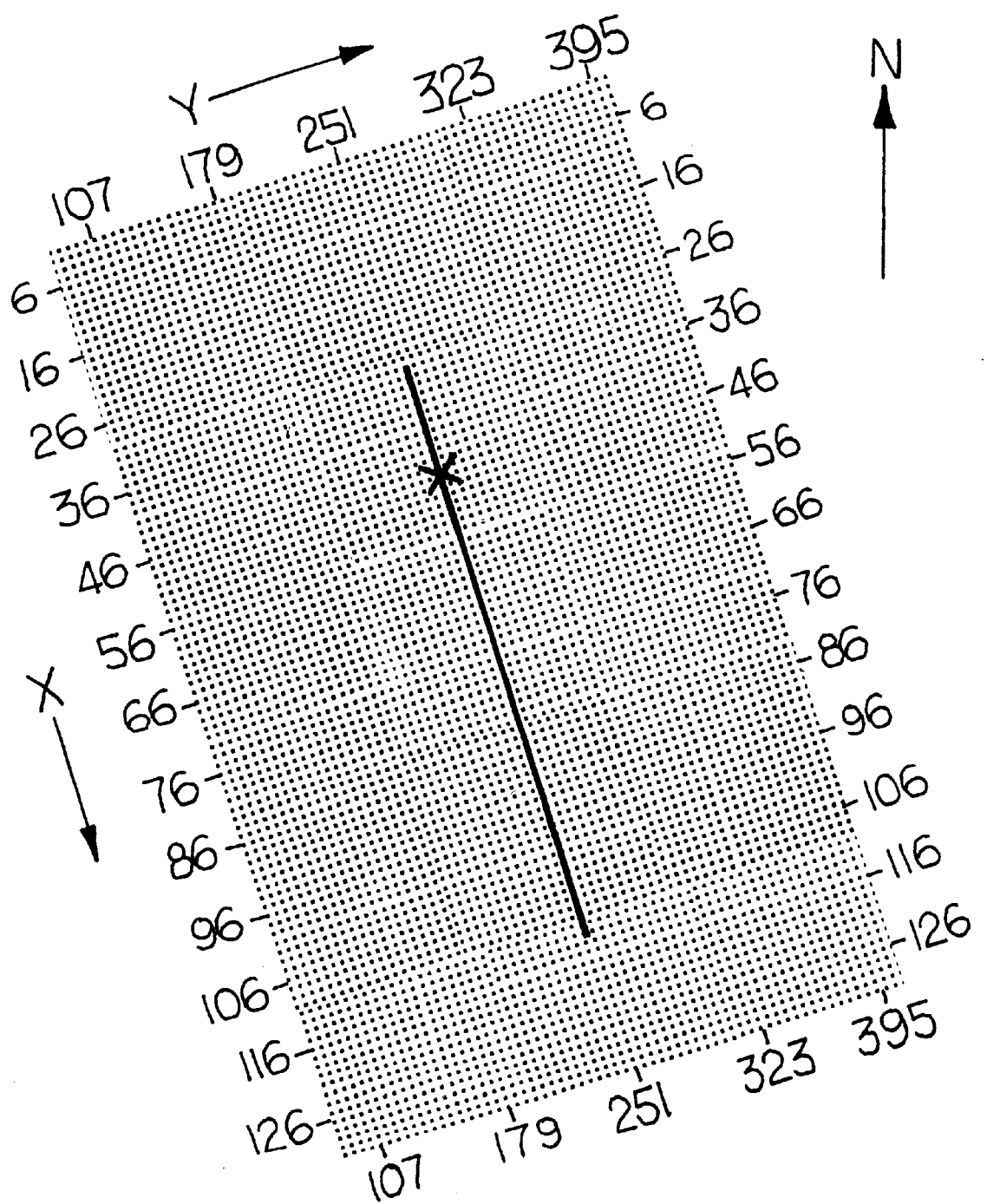
FIG. 2 show the x,y grid of the traces comprising the 3D cube from which the section in FIG. 1 originates. The line at y-position 251 and x-positions ranging from 32 to 110 corresponds with the seismic section of FIG. 1.
Figure 3:
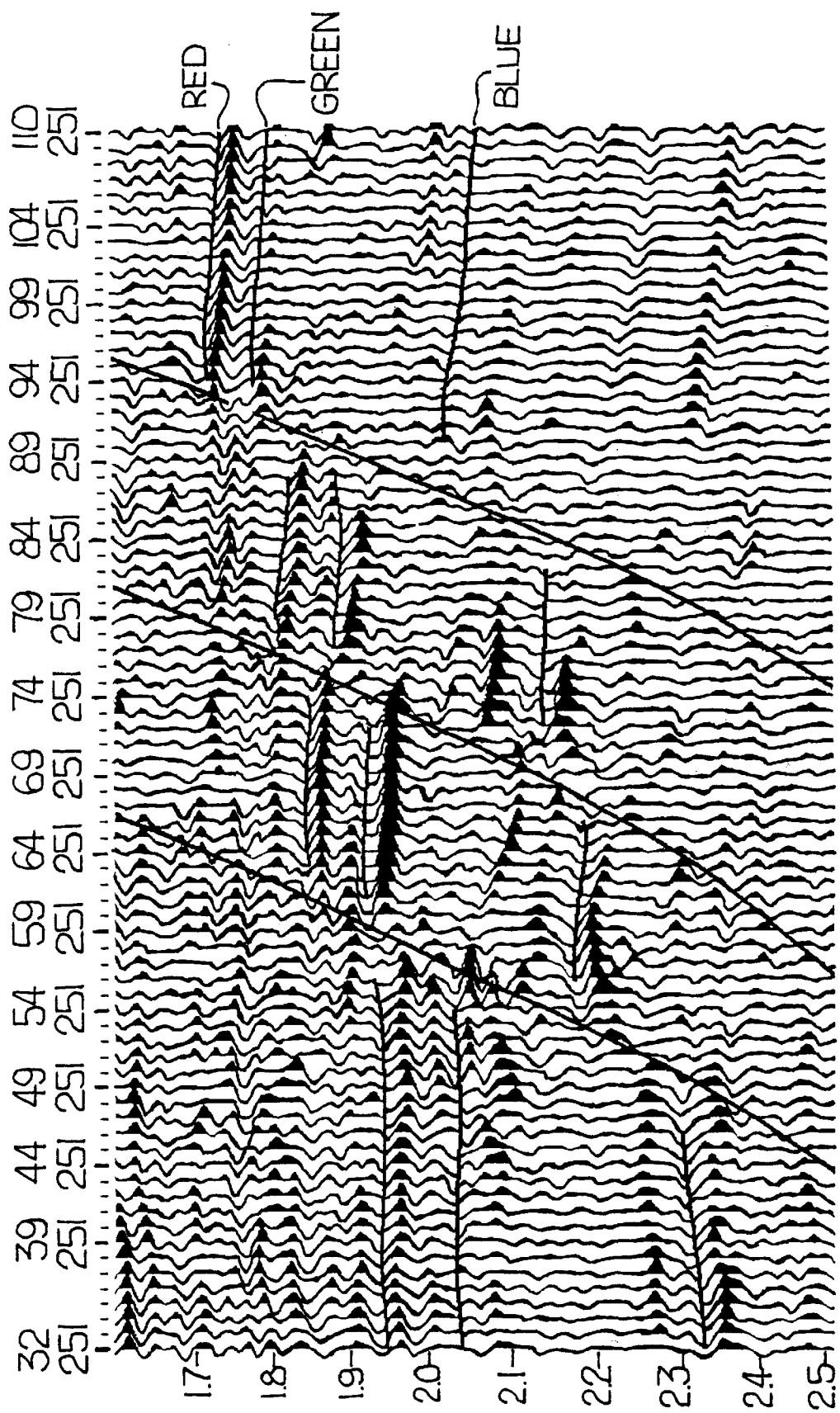
FIG. 3 shows the seismic section of FIG. 1 with superimposed an interpretation of some of the main subsurface structural and stratigraphic features. Such interpretations are usually obtained by using computer graphics workstations with special seismic interpretation software. Horizons and faults are digitized on the computer screen guided by the displayed seismic data. The interpretation on FIG. 3 shows the dip of the stratigraphic units within which the reservoir sands lie and shows some of the faults breaking up the reservoir into different units.

This invention can be embodied in many different forms. The disclosure and description of the invention in the drawings and in this description are illustrative and explanatory thereof, and various changes in the sequence of processing steps, of the parameters in the processing and of the process details may be made without departing from the scope of the invention.

Figure 6A:
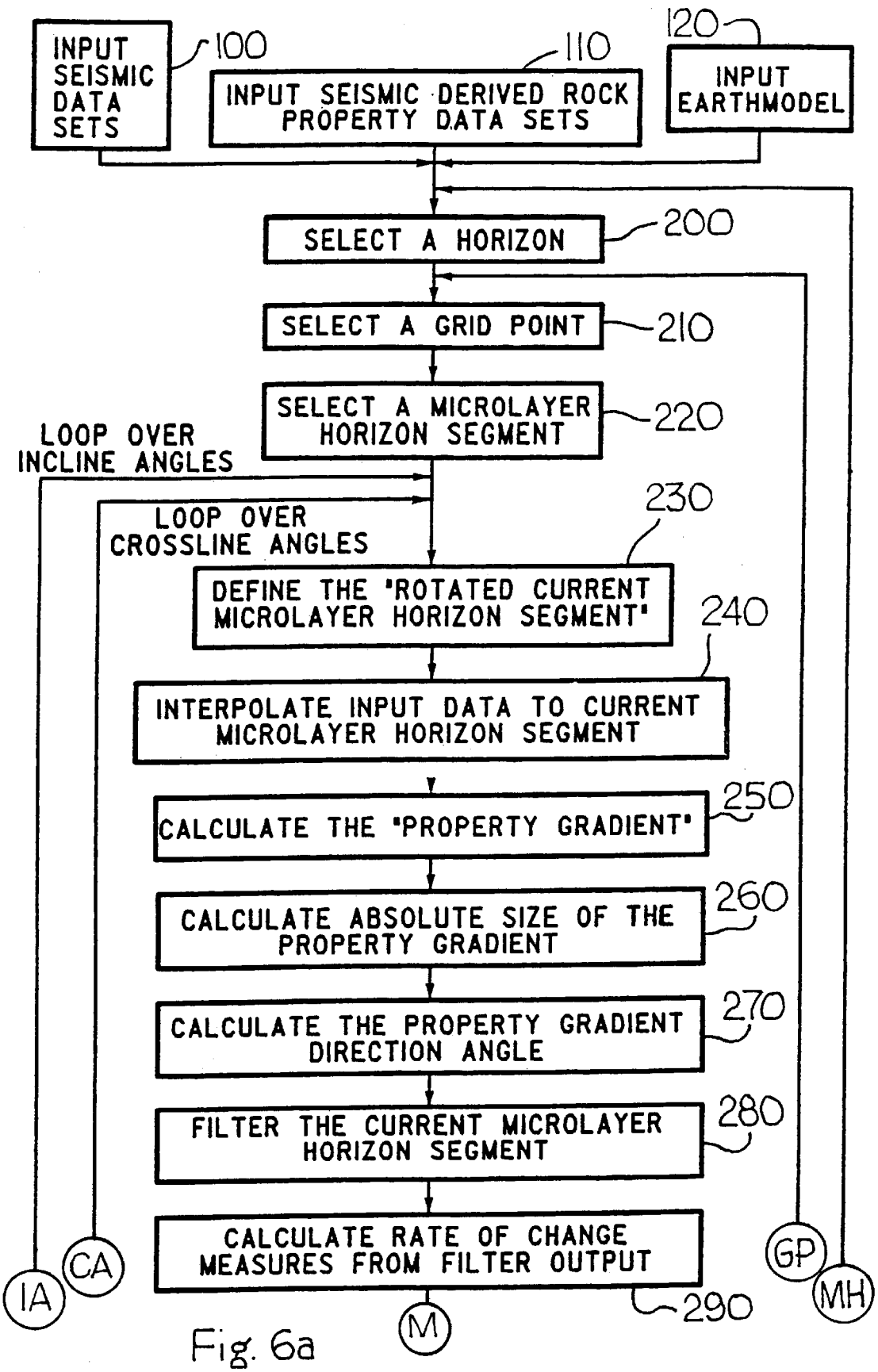
FIGS. 6a and 6b are a flowchart showing the process steps in one embodiment of the new method.
Figure 6B:
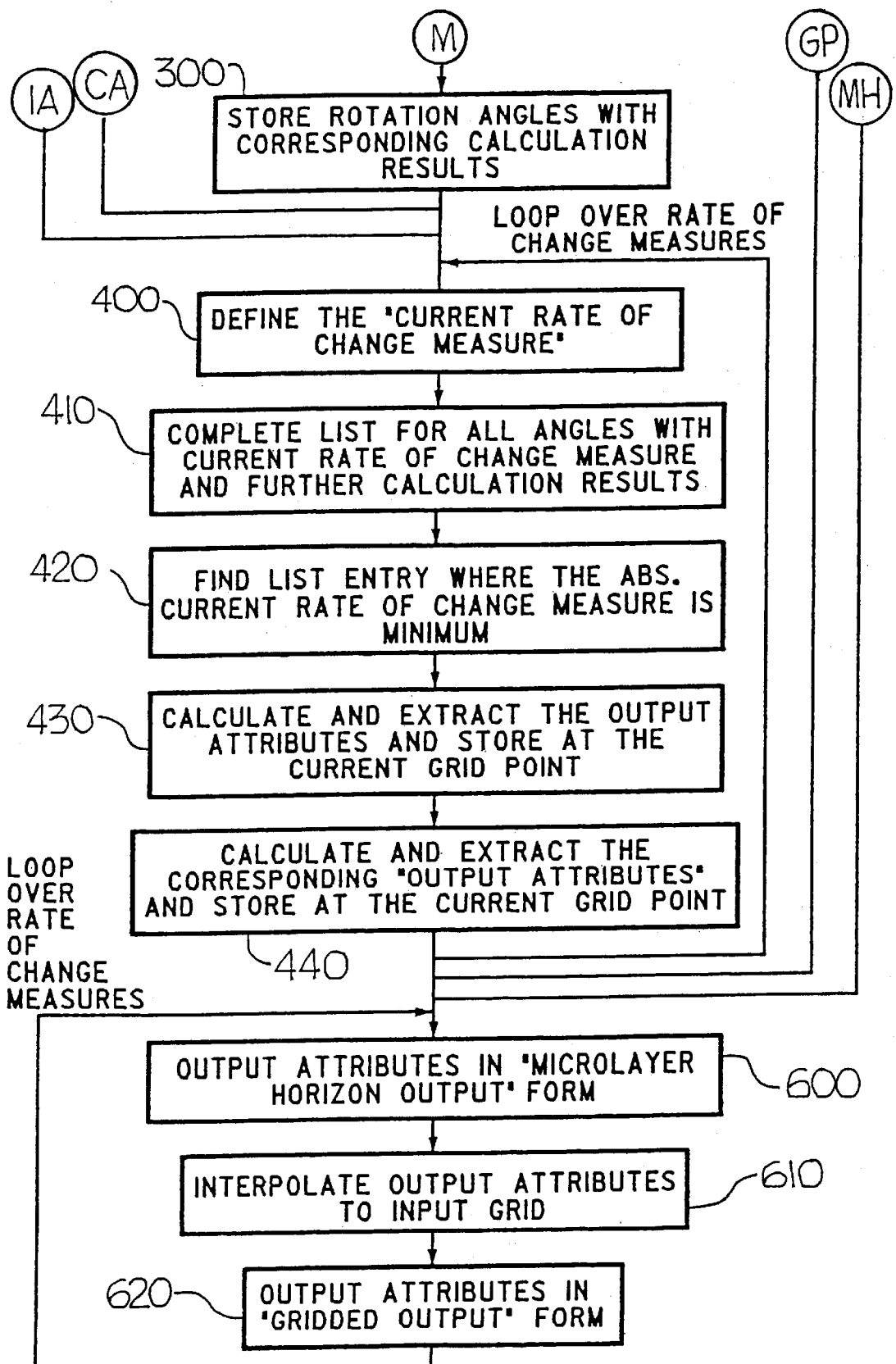

FIGS. 6a and 6b illustrate the steps in the new process in the form of a flowchart. There are three types of input data for the process: seismic data, seismic derived rock property data and a so called 'earthmodel'. The mandatory input consists of an earthmodel and at least one seismic or seismic derived rock property data set.

Step 100 shows the input of the seismic data. Though this is not a necessary condition, the input data is assumed to have been processed to the form of a 2D or 3D data set used for seismic data interpretation, i.e. the data sets consists of sets of seismic traces organized into lines where each trace has a x,y coordinate and each data point of the trace corresponds to a certain seismic travel time or depth (t or z).

Traditionally one data set is obtained from processing for further analysis and interpretation. Increasingly special processes are applied to enhance certain subsurface features relative to a routinely processed data set. For example, seismic data sets may be generated which contain information about seismic waves which have reflected over a certain angle range as these may enhance the possibility to detect fluid boundaries. Therefore, multiple seismic data sets covering the same subsurface zone are increasingly available for analysis and interpretation. Another example is time-lapse seismic data, where seismic data is acquired multiple times over a reservoir in production. In this case differences between the seismic data sets may reveal information about changes in fluid boundaries as hydrocarbons are produced.

Step 110 shows the input of seismic derived rock property data. Seismic derived rock property data can be directly used to analyze changes in lithology and fluids in layers. Also, information about structure and stratigraphy is maintained and often even enhanced relative to seismic data. Use of seismic derived rock property data in subsurface analysis and interpretation is therefore often preferred over the use of seismic reflection data, or is done in conjunction with seismic data subsurface analysis and interpretation. For the same reason the subject method is preferably applied to seismic derived rock property data.

Any of the described types of seismic and seismic derived rock property data sets and other similar data sets may be utilized in the process described in detail below. In practice the process is applied to several data sets, as each data set may highlight different aspects of the spatial changes in subsurface structure, stratigraphy, lithology and fluids.

Figure 4:
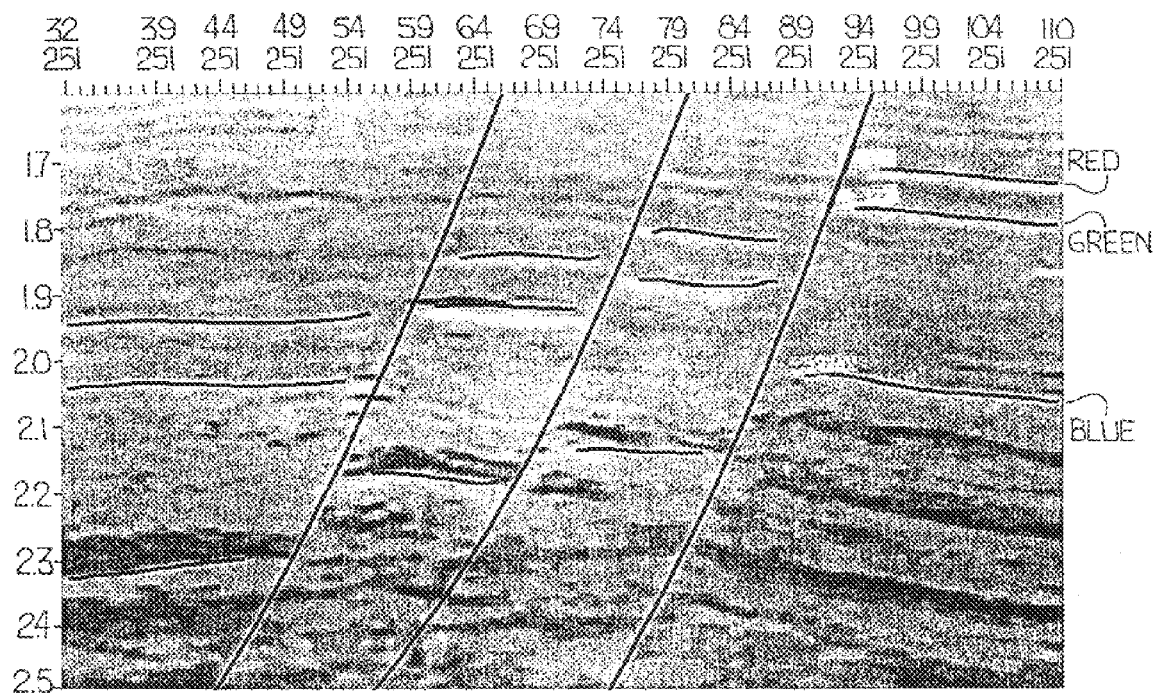
FIG. 4 shows a section of seismic derived rock property data, in this case acoustic impedance, along the same line as FIG. 1.
Figure 5:
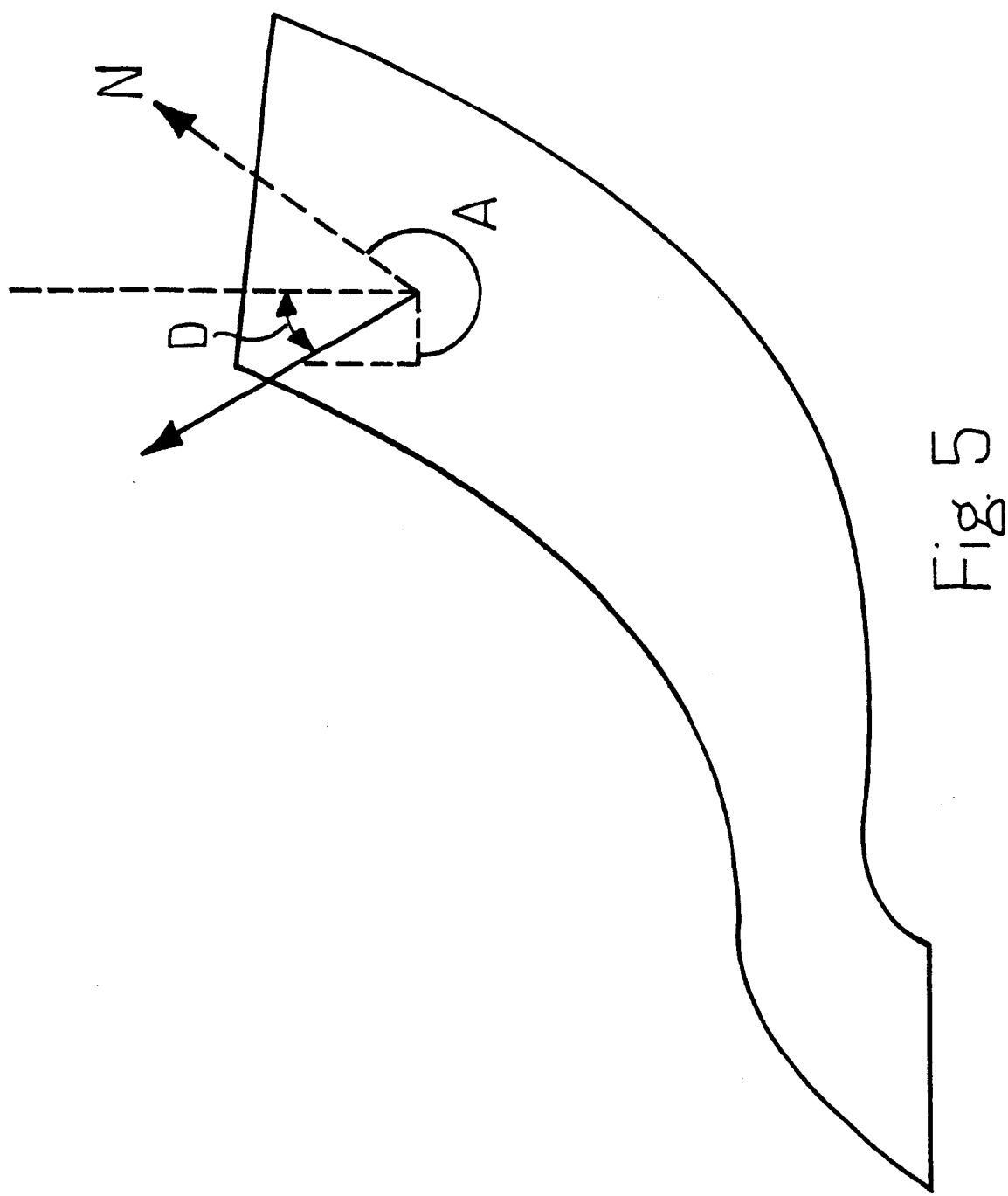
FIG. 5 illustrates the definition of the dip and azimuth to characterize the geometry of a surface.
Figure 7:
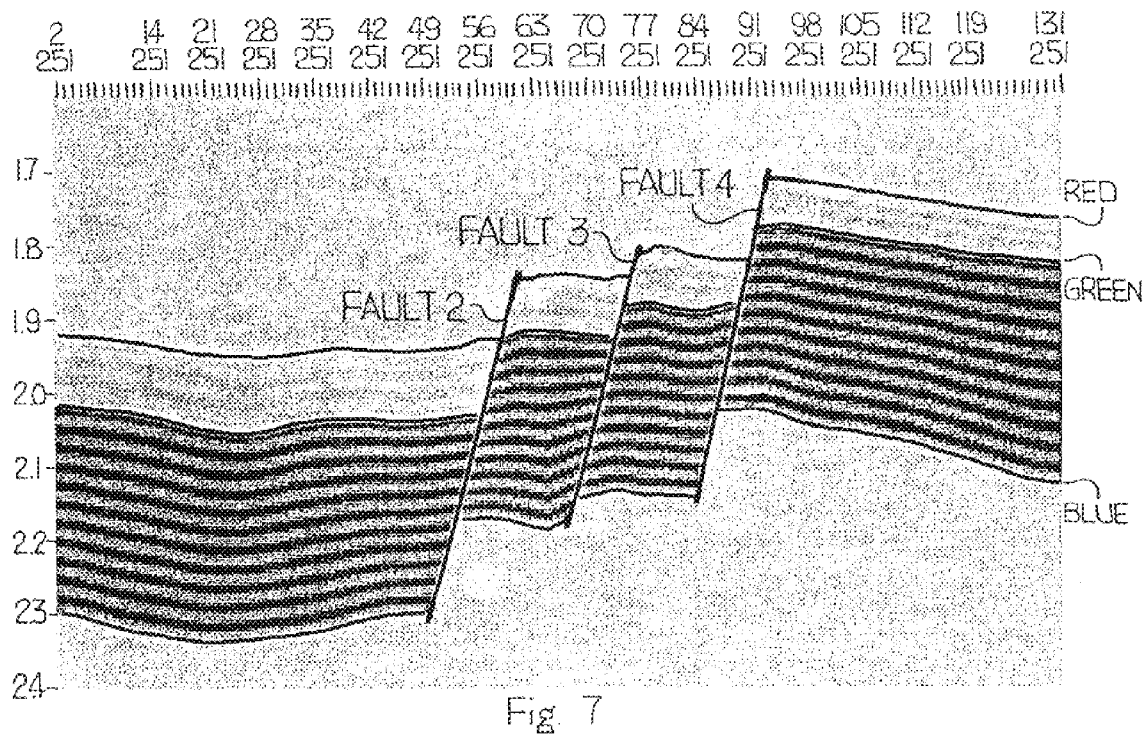
FIG. 7 is an example of the earthmodel built from the interpretation of the of FIG. 3, showing how microlayer horizons run within the layers defined by the input interpretation.

Step 120 is to input the earthmodel for the subsurface area of interest. FIG. 7 shows an example. The earthmodel is determined from an interpretation of subsurface horizons and faults from the seismic data, a part of which is shown in FIG. 1, and/or corresponding seismic derived rock property data, a part of which is shown in FIG. 4, and/or output data from the subject process, and of the geometric relationships between these horizons and faults. From this information an earthmodel can be generated which consists of a set of layers where for each layer the boundaries are determined from the input horizons and faults, and, where, inside each layer, a set of horizons are generated which define the so called microlayers for that layer. The geometry of these microlayer horizons can be modeled in different ways to capture the depositional pattern inside each earthmodel layer. Generally the earthmodel input horizons, user defined reference horizons or a combination of these horizons are used to guide the generation of the microlayer horizons. In case of complex deposition more sophisticated methods can be applied to generate the microlayer horizons. The vertical resolution of these microlayer horizons may vary, but needs to be down to around the vertical time or depth sample interval of the input seismic or seismic derived rock property data to minimize the information extracted by the subject process. The microlayer horizons may be defined on the same x,y grid as the input seismic or seismic derived rock property grids, though this is not a necessary condition. The described earthmodel can range from simple in case the objective is to capture the main spatial changes in subsurface structure, stratigraphy, lithology and fluids using the subject process, or can be very detailed in case the objective is to capture more subtle spatial changes in subsurface structure, stratigraphy, lithology and fluids. At its most simple, the earthmodel will be based on two parallel horizons with the in-between microlayers also running parallel to the input horizons. Very detailed earthmodels are derived by detailed interpretation of the available seismic data, seismic derived rock property data and data generated by the subject process. As the earthmodels become more detailed, the accuracy with which the microlayering of the earthmodel captures the subsurface structure and stratigraphy improves.

The next step is to generate the output data along the microlayer horizons and rotated microlayer horizons which are rotated locally to optimally reduce noise and to capture spatial variations in subsurface structure, stratigraphy, lithology and fluids. The output consists of various measures of the rate of change of the seismic data or seismic derived rock property data relative to the microlayer horizons or locally rotated microlayer horizons, the direction in which the rate of change is largest for each of these measures, the corresponding rotation dip and azimuth and filter output of applied filters. The algorithm is here presented in a form most suitable for disclosure, but may easily be modified into other forms without departing from the scope of the invention. The key calculation steps for the 3D version of the process as applied to one input seismic or seismic derived rock property cube are:

For each microlayer horizon:
Define the selected microlayer horizon as the 'current horizon' (step 200).
  For each grid point on the current horizon: Define the selected grid point as the 'current grid point', find its associated (x,y t or z) coordinates and through interpolation of the seismic or seismic derived rock property input data calculate the amplitude at the current grid point (step 210).
  Find, based on user specified distance criteria, typically between 25 to 500 metros, a set of grid points on the current horizon around the current grid point and determine their (x,y,t or z) coordinates. This set of points, including the current grid point, is defined as the 'current microlayer horizon segment' (step 220).
  For each angle in the inline direction calculated from a user specified inline microlayer horizon segment rotation angle range and increment:
    For each angle in the crossline direction calculated from a user specified crossline microlayer horizon segment rotation angle range and increment:
      Rotate the current microlayer horizon segment around the current grid point according to the current inline and crossline angle to define the 'rotated current microlayer horizon segment' and the coordinates (x',y',t' or z') of the rotated current microlayer horizon segment grid points (step 230). Through interpolation of the seismic or seismic derived rock property input data calculate the amplitude at each point of the rotated current microlayer horizon segment to define the set of data consisting of (a,x', y', t' or z') at each point, where a is the amplitude for that point calculated by the interpolation (step 240).
      From the rotated current microlayer horizon segment and the (a,x',y',t' or z') data of the segment points, calculate the gradient of the amplitudes (a) or, if the user has defined weights for the points of the rotated current microlayer horizon segment, the gradient is calculated by taking into account the weighting (for example, a point which has a weight w relative to the current point, is counted with a weight w in the gradient calculation). The gradient is referred to as 'property gradient' to distinguish it from the geometric gradient of the surface defined by the points (x', y',t' or z'). The calculated property gradient is referred to as property gradient both for the unweighted and weighted case (step 250). Calculate the absolute size of the property gradient. The absolute size of the property gradient is stored as a measure of the rate of change (step 260). Calculate the direction of the property gradient by projecting it onto the x,y plane and then taking the angle relative to north. The angle is stored (step 270). Filter the amplitudes of the rotated current microlayer horizon segment by a set of user define filters. Suitable filters include an averaging filter and any of various non-linear filters such as a median filter. Weights defined by the user may be assigned in the filter operation similar to the way they are used in the weighted property gradient calculation (step 280).

After filteration, for each applied filter type, store the filter output value. Further, for each filter type, calculate the difference between the filter output and the amplitude value (a) at the current grid point, and store these values as further measures of the rate of change (step 290).

Store the inline and crossline rotation angles with the corresponding rate of change measures, property gradient direction and filter outputs (step 300).
      End loop over all crossline angles.
    End loop over all inline angles.
  For each rate of change measure:
    Define the rate of change measure as the 'current rate of change measure' (step 400).
    Retrieve from storage and compile into a list for all inline and crossline angle combinations the following data stored for the current grid point: inline angle, crossline angle, value of the current rate of change measure, the property gradient direction, and, in case of filtering, the filter output value and the difference between the filter output value and the amplitude value at the current grid point (step 410).
    From the list find the entry for which the absolute value of the current rate of change measure is minimum (step 420). From the inline angle and crossline angle corresponding to this entry calculate the dip and azimuth. This dip and azimuth measure the perturbation of the rotated current microlayer horizon segment corresponding to the minimum rate of change measure relative to the current microlayer horizon segment. At this entry also extract the value of the current rate of change measure, the property gradient direction, the amplitude at the current grid point and, in case of filtering, the filter output value and the difference between the filter output value and the amplitude value at the current grid point. All these calculated and extracted values are jointly referred to as the 'output attributes' (step 430).
    Store the output attributes at the current grid point (step 440).
  End loop over all rate of change measures.
  End loop over all grid points of the current microlayer horizon.
End loop over all microlayer horizons.
For each rate of change measure:
  Output the stored information to a file held on computer disk or held in computer memory organized such that from it horizons are readily extracted, where each horizon corresponds to a microlayer horizon and has associated with it at each horizon definition point the corresponding output attributes. This output is further referred to as 'microlayer horizon output' (step 600).

End loop over all rate of change measures.

For each rate of change measure:

Spatially interpolate each output attribute to the (x,y,t or z) grid or subgrid points of the input seismic or seismic derived rock property data used in the process calculations. Alternatively, a user defined grid is used. This output is further referred to as 'gridded output' (step 610).

Output the gridded output to a file held on computer disk or held in computer memory (step 620).

End loop over all rate of change measures.

This algorithm is applied to all available input seismic and seismic derived rock property cubes.

Figure 8:
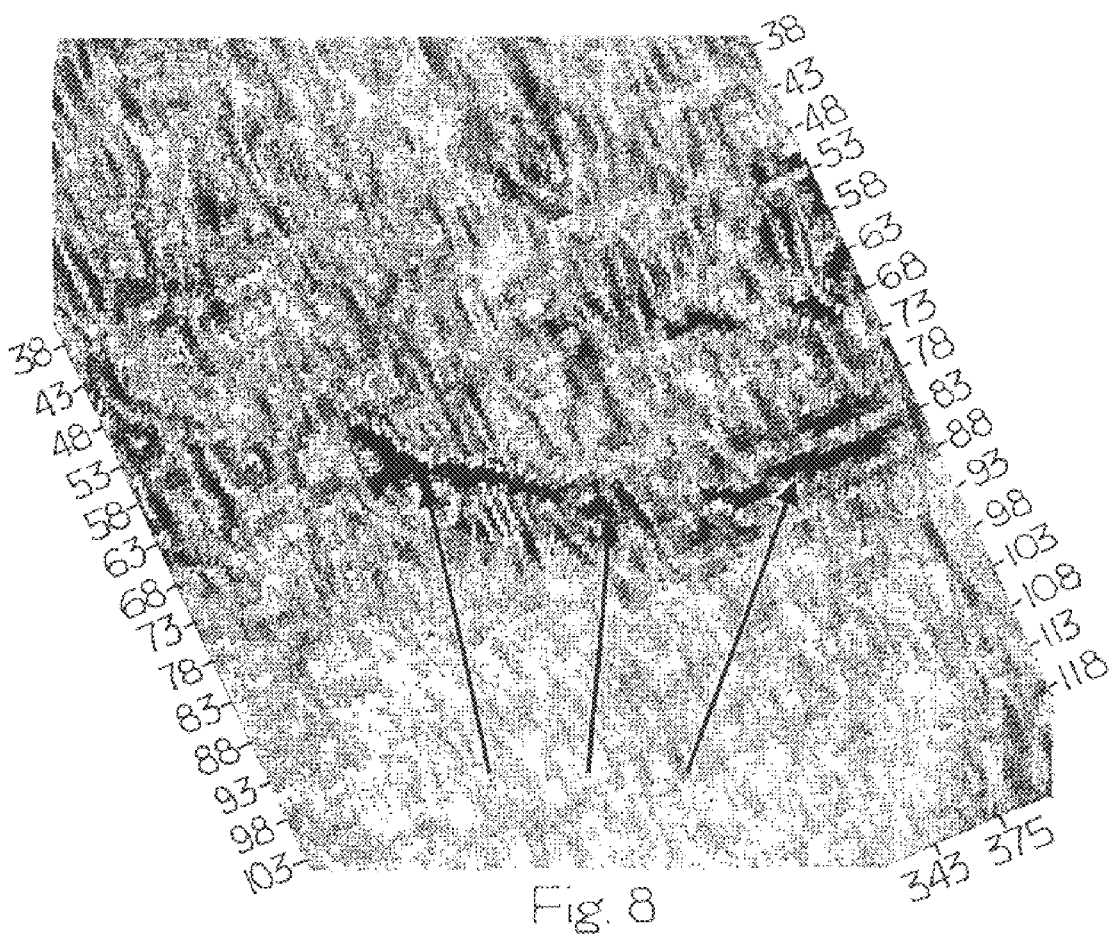
FIG. 8 shows the absolute size of the property gradient on the grid points of a microlayer horizon. The high amplitudes indicated by the arrows clearly show a fault.
Figure 9:
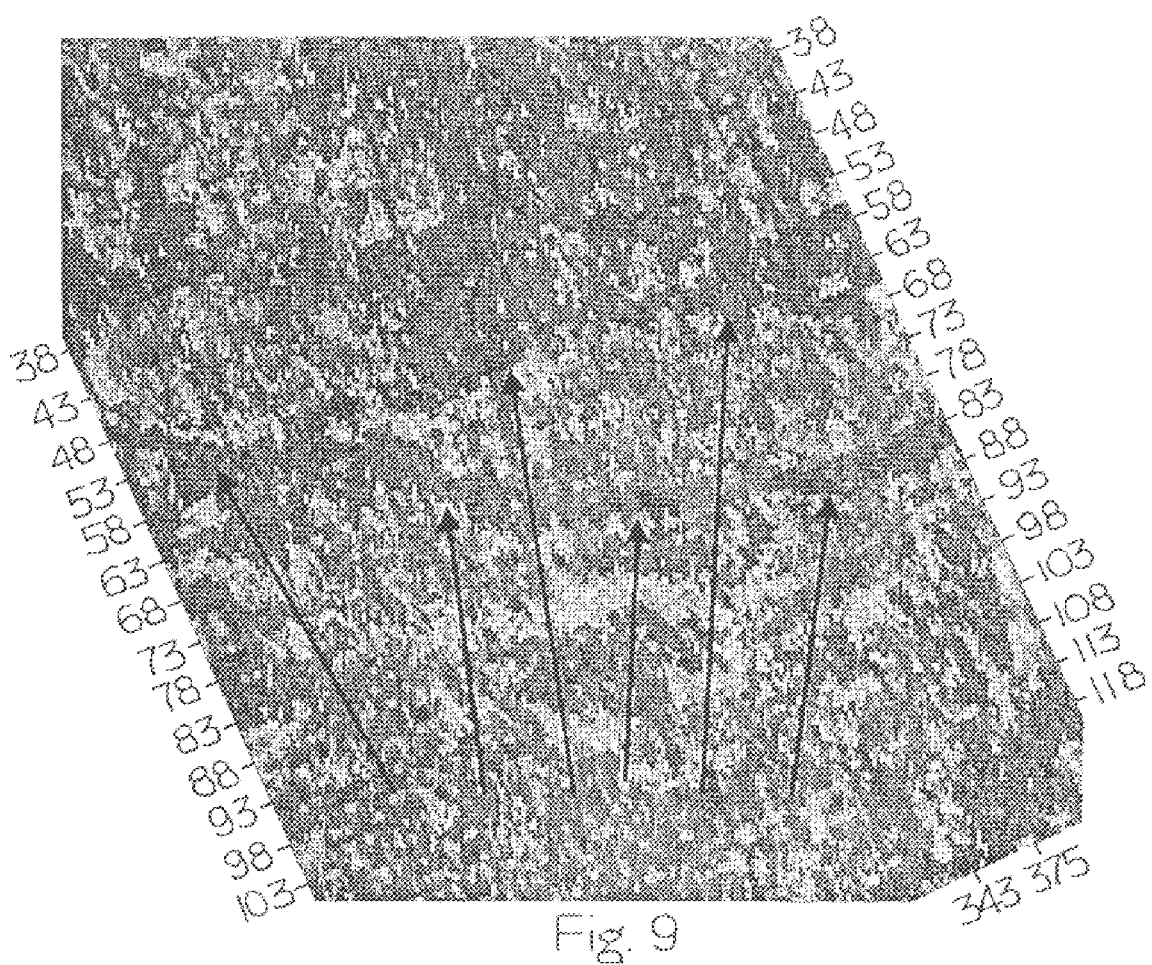
FIG. 9 shows the property gradient azimuth on the grid points of a different microlayer horizon. The high amplitudes indicated by the arrows clearly show multiple faults.
Figure 10:
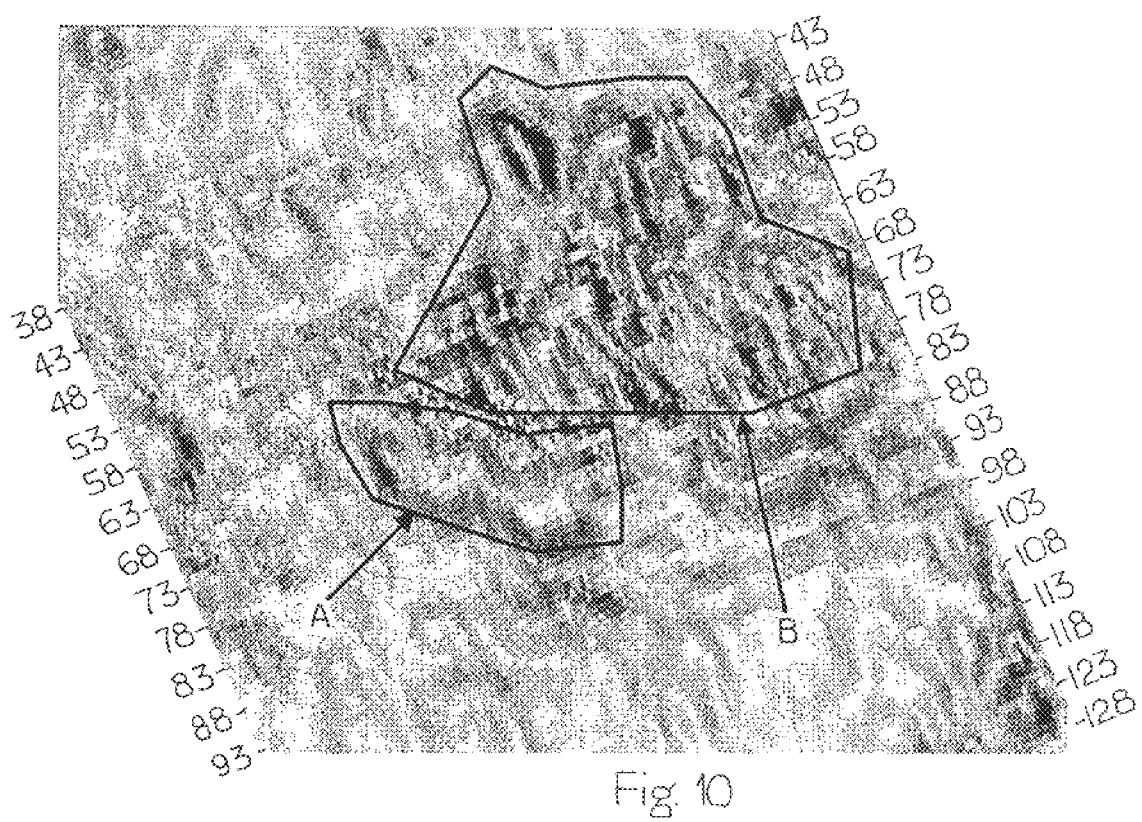
FIG. 10 shows the absolute size of the property gradient on the grid points of yet another microlayer horizon running through some reservoir sands. The property gradient magnitude clearly indicates differences in the lateral continuity of the reservoir sands. In the area A the property gradient magnitude delineates a reservoir sand with good lateral continuity, whereas in area B the rapid lateral variation of the property gradient magnitude indicates that the reservoir sands exhibit poor lateral continuity.

FIG. 8, FIG. 9 and FIG. 10 show example outputs of the new method. FIG. 8 shows the absolute size of the property gradient on the grid points of a microlayer horizon. The high amplitudes indicate by the arrows clearly show a fault. FIG. 9 shows the property gradient azimuth on the grid points of a different microlayer horizon. The high amplitudes indicated by the arrows clearly show multiple faults. FIG. 10 shows the absolute size of the property gradient on the grid points of yet another microlayer horizon running through some reservoir sands. The property gradient magnitude clearly indicates differences in the lateral continuity of the reservoir sands. In the area A the property gradient magnitude delineates a reservoir sand with good lateral continuity, whereas in area B the rapid lateral variation of the property gradient magnitude indicates that the reservoir sands exhibit poor lateral continuity.

The above specified property gradient is calculated by fitting a surface through the amplitudes of the points of the rotated current microlayer horizon segment, where the supplied weights are used to emphasize or de-emphasize the contribution of certain points in the segment. Many different algorithms for surface fitting are available. The surface to be fitted can also vary and can be a plane, bicubic spline or other parametric surface. In the preferred embodiment the user is offered a choice of options for the fitting algorithm and surface type. The property gradient is calculated from the surface at the current definition point and output in the form of the absolute size of the gradient and the corresponding azimuth.

In the final step, the gridded output data is loaded into graphics workstations with standard available seismic data interpretation software for further analysis and interpretation of the information revealed in the output data about the subsurface structure, stratigraphy, lithology and fluids and the spatial changes therein.

The microlayer horizon set allows an alternative and novel method of subsurface data analysis and interpretation, based on the display of any of the attribute values of any of the microlayer horizons in a map view as illustrated in FIG. 8, FIG. 9 and FIG. 10 and on the animated display generated by sequentially stepping through a stack of microlayer horizons ordered in time or depth. If the geometry of the microlayers conforms with the stratigraphy, and assuming that the location of structural boundaries is known, the lateral variations then running the subject process without angle rotation will specifically highlight variations in lithology and fluid. For many geologic environments it is practically not feasible or very time consuming to build a model with such accuracy that the microlayers accurately conform with the subsurface stratigraphy. The desirable goal of finding variations along stratigraphy is then achieved with the described angle rotation procedure. Rotation of the microlayers compensates for inaccuracies in the input model, so that actual lateral variation of seismic and seismic derived rock property data long stratigraphy can be calculated with practically obtainable earthmodels. When the attributes along the microlayer horizons are viewed or when a stack of microlayer horizons is stepped through sequentially in time or depth and the attributes are viewed for each microlayer horizon, new insights into geologic depositional processes and into changes in stratigraphy and lithology are obtained which are not revealed in the analysis and interpretation of the gridded attribute output using standard seismic analysis and interpretation methods.

It is readily apparent how the above algorithm can be applied to 2D seismic and seismic derived rock property data. This is achieved by eliminating the crossline angle perturbation loop. It is also readily apparent that valuable additional data can be generated by applying the described filtering operations when the current rate of change measure is the property gradient. The filters are then applied to the rotated current microlayer horizon segment for which the absolute value of the property gradient is minimum and the filter outputs are stored as further additions to the output attributes. Further, the above describes rate of change measures derived from the property gradient, with or without weights, and filtering operations, with or without weights. Several other rate of change measures can be derived as a function of the current microlayer horizon segment amplitudes and weights, and the use of any rate of change measure derived from such functions is considered part of the method.

The process outputs along each microlayer horizon the values from the input seismic or seismic derived rock property data obtained by interpolation. This allows a method of analysis and interpretation where the user consequently steps through the set of microlayer horizons, and where in the map or 3D view mode the horizon is contoured or color coded with these amplitude values or the values of any of the output attributes. In case the microlayer horizons would be exactly conformable with a given horizon, the results would be the same as obtained with a commonly applied technique where amplitudes are extracted along just one horizon which is copied up and/or down at a user specified interval. With this new analysis and interpretation method superior results are obtained when subsurface structure and stratigraphy are such that the microlayer horizons are not longer conformable with one of the input horizons.

If the filter is applied, the process also yields the filter output as data for further use in analysis and interpretation. Seismic or seismic derived rock property data always contains noise. The filtering process along microlayer horizons provides a new method of noise reduction. The basis for this is that the data points along the microlayer horizon will tend to be more alike than if a filter is run in a direction not conforming to stratigraphy. As a result, the 'stratigraphic filtering process' may reveal features hidden in the noise which may not be recovered with standard applied filters which do not take into account the local geometry. The noise reduction procedure is further enhanced by use of the microlayer horizon rotation procedure. In the rotation procedure each microlayer horizon segment (the current microlayer horizon segment) used in the filtering operation is rotated to find the points which, according to the applied measure, are as alike as possible. Applying a filter to the rotated microlayer horizon segment points corresponding to the optimum value of the applied measure further enhances the noise reduction power of the filter relative to the use of the same filter along microlayer horizons, as these may contain errors in their orientation with respect to stratigraphy.

Two important variations of the above methods are as follows. The first variation is that the optimal angle perturbation procedure is implemented with an optimization procedure instead of the described scanning procedure. The objective function is the absolute value of the then current lateral rate of change measure and the optimization procedure will seek to find the inline and crossline angles under which the objective function is minimized. Such optimization procedures are well described and are readily available for implementation.

The second variation is where the interpolation procedure to calculate amplitudes from the input seismic or seismic derived rock property grids is replaced by a procedure where the amplitudes are calculated by averaging around the current microlayer. One embodiment is to take as averaging range the vertical range from halfway between the current microlayer horizon and the next microlayer horizon above to halfway the current microlayer and the next microlayer below. Another embodiment is to take as averaging range the vertical range to either the next above lying or next below lying microlayer horizon to create averages over the thickness of the microlayers. These averaging operations provide robustness against noise, enhances features with small vertical variation relative to those with larger vertical variation and allow working with microlayer thickness based seismic or seismic derived rock property average values.

The present invention is not limited to the above described embodiment and described variations; the requested rights are determined by the following claims, within the scope of which many modifications can be envisaged. It is intended to cover by the appended claims all such modifications involved within the scope of the claims.

What is claimed is:

1. A method of determining and analyzing spatial changes in the earth's subsurface and of reducing noise in seismic data, comprising the steps of:
   a) obtaining seismic data;
   b) obtaining an earthmodel of the subsurface with layers representative of the subsurface structure;
   c) defining a set of microlayers defined by a set of microlayer horizons between the layer boundaries of the earthmodel;
   d) determining microlayer horizon grid points along a microlayer horizon;
   e) determining the seismic data amplitudes at the microlayer horizon grid points;
   f) determining at each microlayer horizon grid point one or more measures representative of the rate of change of the seismic data amplitudes and/or measures of the direction in which the seismic data amplitudes change and/or determining at each microlayer horizon grid point one or more filter outputs; and
   g) storing as output data items said seismic data amplitudes, said measures and said filter outputs at each microlayer horizon grid point for further analysis of the subsurface.

2. The method according to claim 1, wherein steps d–g are repeated for all microlayer horizons in the earthmodel.

3. The method according to claim 1, wherein step f) includes the steps of
   f1) defining for a microlayer horizon grid point a microlayer surface segment consisting of a set of microlayer horizon grid points on the microlayer horizon which surround and may include said microlayer horizon grid point;
   f2) determining the seismic data amplitudes at the segment points; and
   f3) determining from the seismic data amplitudes at the segment points one or more measures representative of the rate of change of the seismic data amplitudes on that microlayer horizon grid point and/or a measure representative of the direction in which the seismic data amplitudes change.

4. The method according to claim 3, further including, after step f3, the step of filtering the seismic data amplitudes at the segment points with one or more filters to generate one or more filtered amplitude values at the microlayer horizon grid point.

5. The method according to claim 3, further including the steps of:
   f4) rotating the set of segment points around the microlayer horizon grid point to a rotated set of segment points;
   f5) determining the seismic data amplitudes at the rotated set of segment points;
   f6) determining from the seismic data amplitudes at the rotated segment points one or more measured representative of the rate of change of the seismic data amplitudes at the microlayer horizon grid point and a measure representative of the direction in which the seismic data amplitudes change and determining from the rotation further measures representative of the direction in which the seismic data amplitudes change;
   f7) filtering the seismic data amplitudes at the rotated segment points with one or more filters to generate one or more filtered amplitude values at the microlayer horizon grid point;
   f8) determining for each rotation the absolute value of a selected measure representative of the rate of change of the seismic data amplitudes;
   f9) determining the rotation for which the absolute value of said measure is minimum; and
   f10) selecting for output at the microlayer horizon grid point the seismic data amplitude and the measures and filter outputs calculated for said rotation for which the absolute value of said measure is minimum.

6. The method according to claim 1, wherein the seismic data amplitude at the microlayer horizon grid point and the segment point is determined by interpolation of seismic data amplitudes of neighboring grid points of the seismic grid.

7. The method according to claim 1, wherein the seismic data amplitude at the microlayer horizon grid point and the segment points is determined by averaging of the seismic data amplitudes of neighboring grid points of the seismic grid.

8. The method according to claim 7, wherein the averaging is performed by taking the vertical range from halfway between the current microlayer horizon and the next microlayer horizon above to halfway between the current microlayer and the next microlayer horizon below.

9. The method according to claim 7, wherein the averaging is performed by taking as range the vertical range to either the next above lying or next below lying microlayer horizon to create averages over the thickness of the microlayers.

10. The method according to claim 1, wherein one of the measures representative of the rate of change of the seismic amplitudes is the magnitude of the gradient determined from the seismic data amplitudes at the segment points and wherein one of the measures representative of the direction in which the seismic amplitudes change is determined from the projection of the gradient on a horizontal plane and taking the angle relative to a predetermined compass direction.

11. The method according to claim 10, wherein the gradient and direction of the gradient calculations are weighted according to weights assigned to the segment points on which the gradient calculation is based.

12. The method according to claim 1, wherein further measures representative of the rate of change of the seismic amplitudes are obtained by first filtering the seismic amplitude data of the segment points with a linear or non-linear filter to determine the filtered value at the definition point, followed by subtracting it from the seismic data amplitude at the definition point.

13. The method according to claim 12, wherein the filter calculations are weighted according to weights assigned to the segment points used in the filtering.

14. The method according to claim 1, further including the steps of determining further measures representative of the direction in which the seismic data amplitudes change from the rotation by calculating the dip angle of the rotation direction relative to the vertical and by calculating the azimuth angle of the rotation direction by projection of the rotation direction on a horizontal plane and taking the angle relative to a predetermined compass direction.

15. The method according to claim 1, wherein the rotations are realized by stepwise rotating the set of segment points over a plurality of rotation angles in the line direction for 2D seismic data or inline and crossline direction or other set of non parallel directions for 3D seismic data, where for each direction the rotation angles are determined from a user defined rotation angle start value, rotation angle end value and angle increment.

16. The method according to claim 1, wherein an optimization procedure is used to find a series of rotations such that the minimum of the absolute value of said measure is efficiently found.

17. The method according to claim 1, wherein each output data item is stored in its corresponding microlayer horizon at its corresponding microlayer horizon grid point such that for each selected microlayer horizon the corresponding output data items are separately available.

18. The method according to claim 1, wherein for at least one microlayer horizon grid point, an output data item stored for the microlayer horizon is retrieved and displayed for a part or all of the microlayer horizon.

19. The method according to claim 1, wherein for any stack of microlayer horizons sequentially organized in time or depth, the output data items stored for said stack of microlayer horizons are retrieved and displayed sequentially, microlayer horizon by microlayer horizon, for a part or all of the microlayer horizons.

20. The method according to claim 1, wherein:
step (a) includes obtaining the seismic data from an input seismic data grid; and
for any stack of microlayer horizons, any output data item stored for said stack of microlayer horizons is retrieved and regridded to a regular grid which is the same as the input seismic data grid.

21. The method according to claim 1, wherein instead of seismic data seismic derived rock property data is used.

22. The method according to claim 1, wherein the steps are repeated for the different alternative measures for the rate of change, for different definitions of the segment points surrounding each microlayer horizon definition point, and for different weights of the segment points to generate a plurality of sets of output data which each in a different way highlight spatial changes in subsurface geometry, stratigraphy, lithology and fluid distribution.

23. The method according to claim 1, wherein the steps are applied iteratively wherein each step the earthmodel is refined, and where such earthmodel refinements are based on the interpretation and analysis of output data of the process generated on the basis of preceding earthmodels.

24. The method according to claim 1, wherein the method is embodied as a computer program.

* * * * *

UNITED STATES PATENT AND TRADEMARK OFFICE
CERTIFICATE OF CORRECTION

PATENT NO.  : 6,401,042 B1
DATED       : June 4, 2002
INVENTOR(S) : Paul Van Riel et al.

It is certified that error appears in the above-identified patent and that said Letters Patent is hereby corrected as shown below:

Column 3,
Line 23, "frock property" should read -- rock property --.

Column 4,
Line 47, "depicted" should read -- depleted --.

Column 6,
Line 62, "minimize" should read -- maximize --.

Column 8,
Line 22, "After filteration" should read -- After filtering --.

Column 9,
Line 18, "indicate by" should read -- indicated by --.

Column 10,
Line 2, "data long" should read -- data along --.

Signed and Sealed this

Nineteenth Day of November, 2002

*Attest:*

JAMES E. ROGAN
*Director of the United States Patent and Trademark Office*

*Attesting Officer*